United States Patent
Minemura et al.

(10) Patent No.: US 7,349,314 B2
(45) Date of Patent: Mar. 25, 2008

(54) RECORDING METHOD AND OPTICAL DISK DEVICE

(75) Inventors: Hiroyuki Minemura, Kokubunji (JP); Koichi Watanabe, Hachioji (JP)

(73) Assignees: Hitachi, Ltd., Tokyo (JP); Hitachi-LG Data Storage, Inc., Tokyo (JP)

( * ) Notice: Subject to any disclaimer, the term of this patent is extended or adjusted under 35 U.S.C. 154(b) by 567 days.

(21) Appl. No.: 10/933,321

(22) Filed: Sep. 3, 2004

(65) Prior Publication Data

US 2005/0286390 A1 Dec. 29, 2005

(30) Foreign Application Priority Data

Jun. 23, 2004 (JP) ............................. 2004-184410

(51) Int. Cl.
  *G11B 7/0045* (2006.01)
(52) U.S. Cl. ................................. 369/59.11; 369/59.12
(58) Field of Classification Search ............. 369/59.11, 369/59.12
  See application file for complete search history.

(56) References Cited

U.S. PATENT DOCUMENTS

| | | | |
|---|---|---|---|
| 5,109,373 A * | 4/1992 | Ohno et al. | 369/100 |
| 6,654,325 B1 | 11/2003 | Minemura et al. | |
| 6,678,228 B1 | 1/2004 | Kando et al. | |
| 2001/0043540 A1* | 11/2001 | Tieke et al. | 369/59.11 |
| 2001/0053115 A1* | 12/2001 | Nobukuni et al. | 369/59.12 |
| 2002/0085470 A1* | 7/2002 | Yokoi | 369/59.11 |
| 2002/0105883 A1* | 8/2002 | Lee et al. | 369/59.11 |

FOREIGN PATENT DOCUMENTS

| | | |
|---|---|---|
| JP | 10-320777 | 12/1998 |
| JP | 2002-170234 | 6/2002 |
| WO | 01/11614 | 2/2001 |

OTHER PUBLICATIONS

Development of Techniques For Recording Optical Disk at Ultra-High Speed to Realize 16x Speed DVD-RAM Hitachi, Ltd. Apr. 22, 2004; www.hitachi.co.jp/new/cnews/month/2004.
Successful Development of Bismuth-Based Phase Change Recording Film (BCM Recording Film) Enabling High-Speed Recording, Hitachi Maxell, KK Apr. 22, 2004 www.maxell.co.jp/company/news/2004.

* cited by examiner

*Primary Examiner*—Wayne Young
*Assistant Examiner*—Thomas Alunkal
(74) *Attorney, Agent, or Firm*—Antonelli, Terry, Stout & Kraus, LLP.

(57) ABSTRACT

In order that it is realized to put 16x speed DVD-RAM in practice, a recording method coping with CAV (constant angular velocity) and a method for improving S/N ratio are provided and an optical disk device using them is provided. In order that a cutoff phenomenon of pulse in a laser driving circuit may not occur, the shortest pulse width is set at 1 Tw or more where Tw indicates a window width, and a recording pulse in which a 4T mark is recorded with a mono pulse where T indicates a detection window width and the parameter setting range are prescribed. Simultaneously, a reproduction power for 6x speed or more is set at 1.5-2.0 mW, different from a conventional value, and a setup sequence with which deterioration of data in reproducing does not occur is provided. Thereby it becomes possible to put 16x speed DVD-RAM in practice.

6 Claims, 19 Drawing Sheets

FIG. 1A

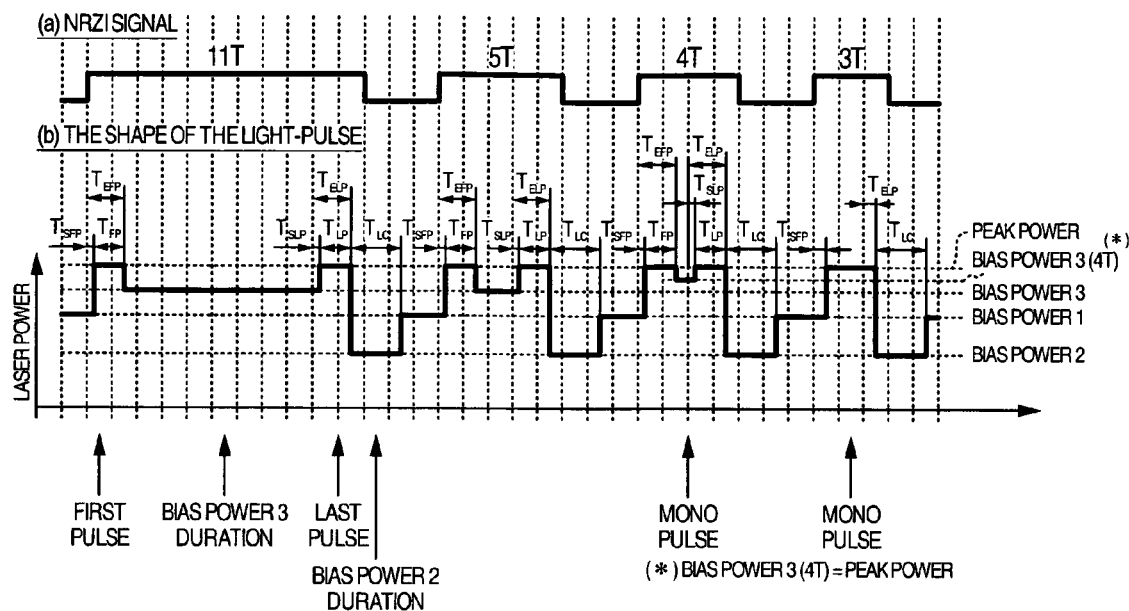

FIG. 1B

| | PARAMETER | RANGE | PARAMETER | RANGE | NOTE |
|---|---|---|---|---|---|
| COMMON PARAMETERS | $T_{LC}$ | +1.0T TO +2.5T | $T_{MP}$ | 0.5T (NOT USED) | $T_{MP}$ SHALL BE IGNORED FOR NON-MULTI PULSE WRITE PULSE |
| ADAPTIVE CONTROL PARAMETERS | $T_{SFP}$ | -0.5T TO +1.0T | $T_{ELP}$ | 0.0T TO +1.5T | VALUES ARE VARIABLE ACCORDING TO NRZI SIGNAL COMBINATION |
| PARAMETER DIFINITION CASE 1 | $T_{EFP}$ | +1.0T TO +2.5T | $T_{EFP} - T_{SFP}$ | +1.0T TO +2.0T | PHYSICAL FORMAT INFORMATION DATA FOR $T_{FP}$ SHALL BE IGNORED |
| | $T_{SLP}$ | -1.0T TO +0.5T | $T_{ELP} - T_{SLP}$ | +1.0T TO +2.0T | PHYSICAL FORMAT INFORMATION DATA FOR $T_{LP}$ SHALL BE IGNORED |
| | (*)$T_{FL}$ | ≧1.0T | | | SPACING BETWEEN FIRST PULSE AND LAST PULSE SHALL NOT BE LESS THAN 1T |
| PARAMETER DIFINITION CASE 2 | $T_{FP}$ | +1.0T TO +2.0T | $T_{SFP} + T_{FP}$ | +1.0T TO +2.5T | PHYSICAL FORMAT INFORMATION DATA FOR $T_{EFP}$ SHALL BE IGNORED |
| | $T_{LP}$ | +1.0T TO +2.0T | $T_{ELP} - T_{LP}$ | -1.0T TO +0.5T | PHYSICAL FORMAT INFORMATION DATA FOR $T_{SLP}$ SHALL BE IGNORED |
| | (*)$T_{FP}$ | ≧1.0T | | | SPACING BETWEEN FIRST PULSE AND LAST PULSE SHALL NOT BE LESS THAN 1T |

(*) $T_{FL} = \{(n-2)T + T_{SLP}\} - T_{EFP}$, n : NRZI SIGNAL LENGTH (UNIT : T)
THIS VALUE INDICATES THE SPACING BETWEEN FIRST PULSE AND LAST PULSE.

FIG.2A

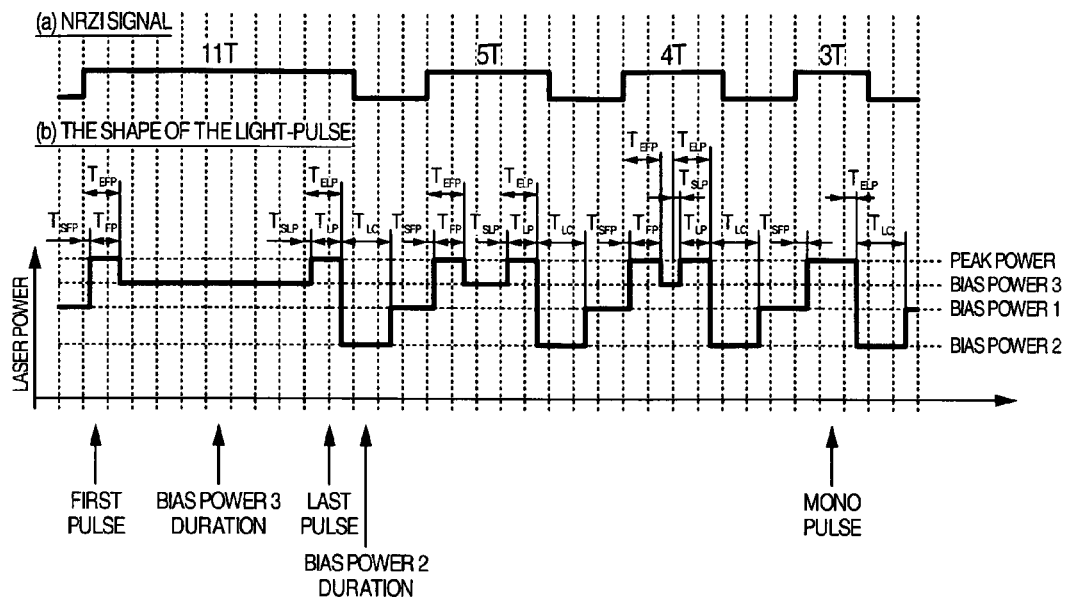

FIG.2B

| | PARAMETER | RANGE | PARAMETER | RANGE | NOTE |
|---|---|---|---|---|---|
| COMMON PARAMETERS | $T_{LC}$ | +1.0T TO +2.5T | $T_{MP}$ | 0.5T (NOT USED) | $T_{MP}$ SHALL BE IGNORED FOR NON-MULTI PULSE WRITE PULSE |
| ADAPTIVE CONTROL PARAMETERS | $T_{SFP}$ | -0.5T TO +1.0T | $T_{ELP}$ | 0.0T TO +1.5T | VALUES ARE VARIABLE ACCORDING TO NRZI SIGNAL COMBINATION |
| PARAMETER DIFINITION CASE 1 | $T_{EFP}$ | +1.0T TO +2.5T | $T_{EFP} - T_{SFP}$ | +1.0T TO +2.0T | PHYSICAL FORMAT INFORMATION DATA FOR $T_{FP}$ SHALL BE IGNORED |
| | $T_{SLP}$ | -1.0T TO +0.5T | $T_{ELP} - T_{SLP}$ | +0.5T TO +1.5T | PHYSICAL FORMAT INFORMATION DATA FOR $T_{LP}$ SHALL BE IGNORED |
| PARAMETER DIFINITION CASE 2 | $T_{FP}$ | +1.0T TO +2.0T | $T_{SFP} - T_{FP}$ | +1.0T TO +2.5T | PHYSICAL FORMAT INFORMATION DATA FOR $T_{EFP}$ SHALL BE IGNORED |
| | $T_{LP}$ | +0.5T TO +1.5T | $T_{ELP} - T_{LP}$ | -1.0T TO +0.5T | PHYSICAL FORMAT INFORMATION DATA FOR $T_{SLP}$ SHALL BE IGNORED |

| POWER & PULSE (NON ADAPTIVE) | VALUES | | | | | | | | |
|---|---|---|---|---|---|---|---|---|---|
| | Tw (ns) | POWER (mW) | | | | PULSE PARAM. (Tw/16) | | | |
| | | Pw | Pg | Pe | Pc | $T_{EFP}$ | $T_{MP}$ | $T_{SLP}$ | $T_{LC}$ |
| | 5.71 | 15.0 | 11.9 | 5.5 | =Pe | 24 | - | 0 | 16 |

| LEADING EDGE CONTROL PARAM. | $T_{SFP}$ | m=3 | m=4 | m=5 | m≧6 | |
|---|---|---|---|---|---|---|
| | s=3 | -2 | -2 | -4 | -5 | s: PREV. SPACE |
| | s=4 | -3 | -3 | -5 | -6 | m: MARK |
| | s=5 | -2 | -2 | -4 | -5 | UNIT(Tw/16) |
| | s≧6 | -2 | -2 | -4 | -5 | |

| TRAILING EDGE CONTROL PARAM. | $T_{ELP}$ | m=3 | m=4 | m=5 | m≧6 | |
|---|---|---|---|---|---|---|
| | s=3 | 4 | 0 | 3 | 10 | s: POST SPACE |
| | s=4 | 4 | 1 | 3 | 10 | m: MARK |
| | s=5 | 3 | 0 | 2 | 9 | UNIT(Tw/16) |
| | s≧6 | 3 | 0 | 2 | 9 | |

Tw : WINDOW WIDTH

| POWER & PULSE (NON ADAPTIVE) | Tw (ns) | POWER (mW) | | | | PULSE PARAM. (Tw/16) | | | |
|---|---|---|---|---|---|---|---|---|---|
| | | Pw | Pg | Pe | Pc | $T_{EFP}$ | $T_{MP}$ | $T_{SLP}$ | $T_{LC}$ |
| | 3.43 | 16.8 | 14.1 | 6.7 | =Pe | 24 | - | 0 | 16 |

| LEADING EDGE CONTROL PARAM. | $T_{SFP}$ | m=3 | m=4 | m=5 | m≧6 | |
|---|---|---|---|---|---|---|
| | s=3 | -2 | -2 | -4 | -5 | s: PREV. SPACE |
| | s=4 | -3 | -3 | -5 | -6 | m: MARK |
| | s=5 | -2 | -2 | -4 | -5 | UNIT(Tw/16) |
| | s≧6 | -2 | -2 | -4 | -5 | |

| TRAILING EDGE CONTROL PARAM. | $T_{ELP}$ | m=3 | m=4 | m=5 | m≧6 | |
|---|---|---|---|---|---|---|
| | s=3 | 8 | 4 | 6 | 6 | s: POST SPACE |
| | s=4 | 8 | 5 | 6 | 6 | m: MARK |
| | s=5 | 7 | 4 | 5 | 5 | UNIT(Tw/16) |
| | s≧6 | 7 | 4 | 5 | 5 | |

Tw: WINDOW WIDTH

16X SPEED

| POWER & PULSE (NON ADAPTIVE) | VALUES | | | | | | | | |
|---|---|---|---|---|---|---|---|---|---|
| | Tw (ns) | POWER (mW) | | | | PULSE PARAM. (Tw/16) | | | |
| | | Pw | Pg | Pe | Pc | $T_{EFP}$ | $T_{MP}$ | $T_{SLP}$ | $T_{LC}$ |
| | 2.14 | 19.5 | 17.5 | 8.4 | =Pe | 24 | - | 0 | 16 |

| LEADING EDGE CONTROL PARAM. | $T_{SFP}$ | m=3 | m=4 | m=5 | m≧6 | |
|---|---|---|---|---|---|---|
| | s=3 | -2 | -1 | -4 | -4 | s: PREV. SPACE |
| | s=4 | -3 | -2 | -5 | -5 | m: MARK |
| | s=5 | -3 | -1 | -5 | -5 | UNIT(Tw/16) |
| | s≧6 | -3 | -1 | -5 | -5 | |

| TRAILING EDGE CONTROL PARAM. | $T_{ELP}$ | m=3 | m=4 | m=5 | m≧6 | |
|---|---|---|---|---|---|---|
| | s=3 | 14 | 10 | 11 | 10 | s: POST SPACE |
| | s=4 | 14 | 10 | 11 | 10 | m: MARK |
| | s=5 | 13 | 9 | 10 | 9 | UNIT(Tw/16) |
| | s≧6 | 13 | 9 | 10 | 9 | |

Tw: WINDOW WIDTH

6X SPEED

WRITE PULSE SHAPE

Pw (PEAK POWER)
Pg (BIAS POWER 3)
Pe (BIAS POWER 1)
Pc (BIAS POWER 2)

| POWER & PULSE (NON ADAPTIVE) | | VALUES | | | | | | | |
|---|---|---|---|---|---|---|---|---|---|
| | Tw (ns) | POWER (mW) | | | | PULSE PARAM. (Tw/16) | | | |
| | | Pw | Pg | Pe | Pc | $T_{EFP}$ | $T_{MP}$ | $T_{SLP}$ | $T_{LC}$ |
| | 5.71 | 15.0 | 11.9 | 5.5 | =Pe | 24 | - | 0 | 16 |

| LEADING EDGE CONTROL PARAM. | $T_{SFP}$ | m=3 | m=4 | m=5 | m≧6 | |
|---|---|---|---|---|---|---|
| | s=3 | -2 | -2 | -4 | -5 | s: PREV. SPACE |
| | s=4 | -3 | -3 | -5 | -6 | m: MARK |
| | s=5 | -2 | -2 | -4 | -5 | UNIT(Tw/16) |
| | s≧6 | -2 | -2 | -4 | -5 | |

| TRAILING EDGE CONTROL PARAM. | $T_{ELP}$ | m=3 | m=4 | m=5 | m≧6 | |
|---|---|---|---|---|---|---|
| | s=3 | 4 | 4 | 3 | 10 | s: POST SPACE |
| | s=4 | 4 | 5 | 3 | 10 | m: MARK |
| | s=5 | 3 | 4 | 2 | 9 | UNIT(Tw/16) |
| | s≧6 | 3 | 4 | 2 | 9 | |

Tw: WINDOW WIDTH

10X SPEED

WRITE PULSE SHAPE

- Pw (PEAK POWER)
- Pg (BIAS POWER 3)
- Pe (BIAS POWER 1)
- Pc (BIAS POWER 2)

| | | VALUES | | | | | | | |
|---|---|---|---|---|---|---|---|---|---|
| POWER & PULSE (NON ADAPTIVE) | Tw (ns) | POWER (mW) | | | | PULSE PARAM. (Tw/16) | | | |
| | | Pw | Pg | Pe | Pc | $T_{EFP}$ | $T_{MP}$ | $T_{SLP}$ | $T_{LC}$ |
| | 3.43 | 16.8 | 14.1 | 6.7 | =Pe | 24 | - | 0 | 16 |
| LEADING EDGE CONTROL PARAM. | $T_{SFP}$ | m=3 | m=4 | m=5 | m≥6 | s: PREV. SPACE m: MARK UNIT(Tw/16) | | | |
| | s=3 | -2 | -2 | -4 | -5 | | | | |
| | s=4 | -3 | -3 | -5 | -6 | | | | |
| | s=5 | -2 | -2 | -4 | -5 | | | | |
| | s≥6 | -2 | -2 | -4 | -5 | | | | |
| TRAILING EDGE CONTROL PARAM. | $T_{ELP}$ | m=3 | m=4 | m=5 | m≥6 | s: POST SPACE m: MARK UNIT(Tw/16) | | | |
| | s=3 | 8 | 7 | 6 | 6 | | | | |
| | s=4 | 8 | 7 | 6 | 6 | | | | |
| | s=5 | 7 | 6 | 5 | 5 | | | | |
| | s≥6 | 7 | 6 | 5 | 5 | | | | |

Tw: WINDOW WIDTH

16X SPEED

WRITE PULSE SHAPE

Pw (PEAK POWER)
Pg (BIAS POWER 3)
Pe (BIAS POWER 1)
Pc (BIAS POWER 2)

| | VALUES | | | | | | | |
|---|---|---|---|---|---|---|---|---|
| POWER & PULSE (NON ADAPTIVE) | Tw (ns) | POWER (mW) | | | | PULSE PARAM. (Tw/16) | | |
| | | Pw | Pg | Pe | Pc | $T_{EFP}$ | $T_{MP}$ | $T_{SLP}$ | $T_{LC}$ |
| | 2.14 | 19.5 | 17.5 | 8.4 | =Pe | 24 | - | 0 | 16 |

| LEADING EDGE CONTROL PARAM. | $T_{SFP}$ | m=3 | m=4 | m=5 | m≧6 | |
|---|---|---|---|---|---|---|
| | s=3 | -2 | -1 | -4 | -4 | s: PREV. SPACE m: MARK UNIT(Tw/16) |
| | s=4 | -3 | -2 | -5 | -5 | |
| | s=5 | -3 | -1 | -5 | -5 | |
| | s≧6 | -3 | -1 | -5 | -5 | |

| TRAILING EDGE CONTROL PARAM. | $T_{ELP}$ | m=3 | m=4 | m=5 | m≧6 | |
|---|---|---|---|---|---|---|
| | s=3 | 14 | 11 | 11 | 10 | s: POST SPACE m: MARK UNIT(Tw/16) |
| | s=4 | 14 | 11 | 11 | 10 | |
| | s=5 | 13 | 10 | 10 | 9 | |
| | s≧6 | 13 | 10 | 10 | 9 | |

Tw: WINDOW WIDTH

FIG.16
| W/R SPEED | 1ST WRITE | OVER WRITE 10 |
|---|---|---|
| 6X | 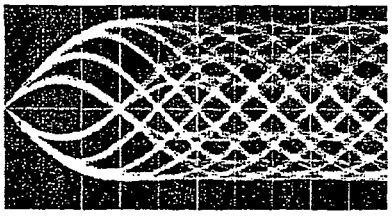 | 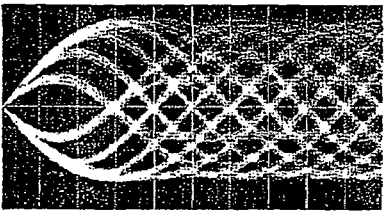 |
| JITTER | 5.2% | 7.7% |
| bER | < 1x10$^{-7}$ | 2x10$^{-7}$ |
| 16X | 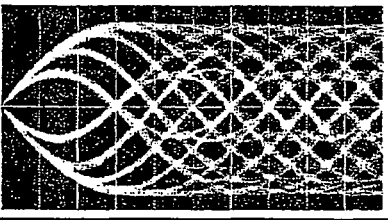 | 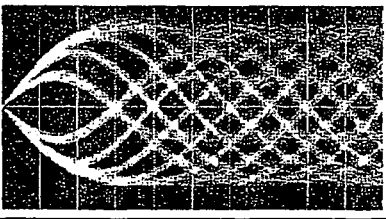 |
| JITTER | 5.8% | 8.9% |
| bER | < 1x10$^{-7}$ | 4x10$^{-7}$ |
(*) BIT ERROR RATES WERE MEASURED USING PRML CHANNEL

FIG.17

| READ CONDITIONS | | WRITE/TEST-WRITE SPEED | | | |
|---|---|---|---|---|---|
| | | 1st WRITE | | OVERWRITE 10 TIMES | |
| MEASUREMENT | SPEED | 6X | 16X | 6X | 16X |
| JITTER | 2X | 4.7% | 4.6% | 7.6% | 8.9% |
| | 6X | 5.2% | 5.3% | 7.8% | 8.9% |
| | 16X | 5.8% | 5.8% | 7.9% | 9.1% |
| BIT ERROR RATE BY PR (3,4,4,3) ML METHOD | 2X | $<10^{-7}$ | $<10^{-7}$ | $<10^{-7}$ | $4 \times 10^{-7}$ |
| | 6X | $<10^{-7}$ | $<10^{-7}$ | $<10^{-7}$ | $4 \times 10^{-7}$ |
| | 16X | $<10^{-7}$ | $<10^{-7}$ | $<10^{-7}$ | $4 \times 10^{-7}$ |

RECORDING METHOD AND OPTICAL DISK DEVICE

INCORPORATION BY REFERENCE

The present application claims priority from Japanese application JP2004-184410 filed on Jun. 23, 2004, the content of which is hereby incorporated by reference into this application.

BACKGROUND OF THE INVENTION

The present invention relates to a recording method and an optical disk device, wherein a record mark different in physical properties from the other portion is formed on a record medium to record information, and particularly to a recording method for a DVD-RAM medium using a phase change optical recording material, and an optical disk device using it.

As rewritable type DVD-RAM using a phase change optical material, those of 2× speed, 3× speed, and 5× speed have been standardized, and a super multi drive coping with those have been already produced. At the present in which spread of recording type DVD drives has advanced, an increase in recording/reproducing speed is the most important technical development issue. The present writer and others realized 16× speed recording using DVD-RAM first in the world, and published an outline of the technique as a news release (Outline of drive technique: http://www.hitachi.co.jp/New/cnews/month/2004/04/0422a.html, Outline of medium technique: http://www.maxell.co.jp/company/news/2004/040422.html).

Further, in an optical disk device capable of recording on a DVD-RAM medium, for guaranteeing the reliability of recorded data, conditions of recording power and pulse are calibrated by trial writing. As an example of a conventional trial writing technique, JP-A-10-320777 discloses a technique in which, not a jitter value is directly measured, but a logical pulse called error pulse is generated when the phase difference between a data edge and a clock edge has become a predetermined value or more; the jitter value is equivalently evaluated by counting the number of error pulses; and using it, the recording power is made appropriate.

Further, WO01/011614 discloses a trial writing technique for 4.7 GB DVD-RAM using a table reference type adaptive recording strategy in accordance with a space length and a mark length after and behind. Therein, sort processing is performed with making an error pulse correspond to a table of the recording strategy, and pulse conditions of recording laser light are made appropriate in order that the error pulse value of each item in the table becomes the minimum. Although actual sort processing requires two of 4×4 tables, because a logical pulse called error pulse is used for signal evaluation, there is a merit that sort processing can easily be realized by logical LSI.

For put a drive device and a medium in practical use using the above techniques, there are the following two problems:

(Problem 1) Guarantee of compatibility of recording parameters and realization of CAV (Constant Angular Velocity) recording.

(Problem 2) Improvement of S/N ratio upon high-speed reproduction and guarantee of storage life of data.

First, the problem 1 will be described. For making 16× speed recording on DVD-RAM, because the linear velocity reaches about 66 m/s, the rotational speed of the medium reaches about 11,000 rpm even in the outermost peripheral zone. In general, in case of a DVD disk using a plastic base, the natural vibration of the medium increases as the rotational speed increases, and not only the noise increases, but also the medium is broken in the worst case. Thus, the upper limit of the rotational speed of the medium is about 15,000 rpm at the maximum. Because the rotational speed of the medium exceeds 25,000 rpm for obtaining the linear velocity of 16× speed on the innermost circumference, it can not be realized at present. Therefore, for realizing high-speed recording on DVD-RAM, it is required to record by CAV method in which the rotational speed of the medium is substantially constant. At this time, the linear velocity changes in proportion to the radial position, and it is about 6× speed on the innermost circumference and about 16× speed on the outermost circumference. In the format of DVD-RAM, for studying conditions of recording power and pulse, there are trial writing areas in the innermost circumferential zone and the outermost circumferential zone. Thus, recording conditions for the other zone must be set from the recording conditions of the innermost circumferential zone and the outermost circumferential zone.

Next, the problem 2 will be described. Not limiting to the case of DVD-RAM, for realizing recording at a high speed, because the power necessary for recording becomes large, a higher-power semiconductor laser must be installed in the drive device. In general, the laser noise increases as the power of the semiconductor laser increases. Further, if the reproduction speed is increased, influence by amplifier noise and laser noise contained in a reproduction signal increases to correspond to the spread of band. Therefore, for reproducing record information at a high speed with high reliability, some S/N ratio improving means is required.

SUMMARY OF THE INVENTION

An object of the present invention is to solve the above two problems when a DVD-RAM 16× speed technique is put in practical use, and thereby provide a recording method suitable for CAV recording and an optical disk device using it.

First, means for solving (Problem 1) will be described.

FIGS. 2A and 2B show a non-multi type recording pulse adopted by 5× speed DVD-RAM. FIG. 2A shows the shape of the recording pulse. The recording pulse is a pulse string having four power levels of Peak Power, Bias Power 1, Bias Power 2, and Bias Power 3. Only a 3T mark shape pulse is a mono pulse and the others are a first pulse, a last pulse, and a pulse connected between them by Bias Power 3 level (hereinafter referred to as middle pulse). For good control of the mark shape, in the case 1 as a general case, the start edge position $T_{SFP}$ of the first pulse and the end edge position $T_{ELP}$ of the last pulse are adaptively set in accordance with the mark length and the space lengths after and behind. In the recording pulse shown, the portion having the narrowest width is the middle pulse of a 4T mark, the width of which is about 0.5T.

FIG. 2B shows the setting possible range of each parameter.

Here, a problem for realizing high-speed CAV recording will be described more specifically. FIG. 3 typically shows a laser driving circuit in a general DVD-RAM evaluation system. In a general construction, two switch instructions (digital signals) output from a pulse generator turn on/off switches of a power supply corresponding to the respective instructions. Here, for simplification, a case wherein the number of recording power levels is two is shown. However, by increasing the switch instructions and the corresponding power supplies, the power levels can be increased. This type of laser driving circuit is called current switch type. In such a construction, although a transistor circuit is used in a switch portion for ON/OFF control of the power supply, for realizing high-speed recording, there is a necessity that conflicting performances of large current capacity and high speed must be satisfied together.

FIG. 4 shows characteristics of a laser driving circuit of a DVD-RAM evaluator (LM330A) made by ShibaSoku used in an experiment, which shows results of measurement of a relation between the recording pulse width and the peak power. As shown in the drawing, when the switch instruction pulse width becomes about 1.7 ns or less, the switch circuit does not respond and no light pulse emits (hereinafter referred to as cutoff phenomenon). In case of DVD-RAM 16× speed, the detection window width (=IT) is about 2.1 ns. In case of the conventional non-multi pulse type recording pulse as described above, because the middle pulse width of the 4T mark is about 1 ns (about 0.5T), a light pulse does not normally emit. In this case, although the cutoff phenomenon does not arise till about 10× speed, when the speed exceeds about 10× speed, the cutoff phenomenon appears in the middle pulse of the 4T mark. In the LM330A evaluator, under 16× speed conditions, the power level of the middle pulse portion of the 4T mark became the level of Peak Power. It is determined in accordance with the construction of the installed laser driving circuit which power level emits, and the power level does not always become the level of Peak Power. On the other hand, as the laser driving IC to be installed in the drive device, other than the current switch type, there is a DAC type laser driving circuit in which the power level is directly controlled using a D/A converter, and further there is one in which no cutoff phenomenon arises till a short pulse width. Although a laser driving IC of such a type is mounted on a head, because it has therein a recording pulse generation logical circuit, the consumed electric power and heat generation are large and further the cost is high. In a slim drive device for a note personal computer severe to the power consumption, or a drive device aiming at a low price, in future, there is possibility that a current switch type laser driving IC is adopted.

In a DVD-RAM medium, conditions of recording pulse recommended by the medium maker are recorded in an emboss data area (control data) on the inner circumference. The drive device reproduces this information and conditions of recording power and pulse are calibrated by trial writing. Conventionally, under conditions till 5× speed, even with an evaluator used by the medium maker and even with a drive device on the market, no cutoff phenomenon arose, and thus compatibility of recording parameters was guaranteed. However, for realizing 16× speed recording, if the cutoff phenomenon arises in either of the evaluator and the drive device on the market, compatibility of the recording parameters described in the control data is not satisfied.

As described before, 16× speed recording of DVD-RAM must be realized by CAV recording. For realizing this, trial writing is performed on the innermost circumference (zone 0, about 6× speed) and the outermost circumference (zone 34, about 16× speed), and for the recording parameters of zones 1 to 33, those that interpolated to the respective zone numbers from the parameters having been calibrated in zones 0 and 34 may be used. At this time, assuming that the parameter of power or pulse of the zone number n is generally P[n], the parameter may be determined using the following equation.

$$P[n] = P[0] + (P[34] - P[0]) \times \frac{n}{334} \quad \text{(Equation 1)}$$

wherein P[0]: an inner circumference trial writing result and P[34]: an outer circumference trial writing result.

(Equation 1) indicates a determination method of recording parameter for each zone in case of CAV recording. However, in accordance with the drive device, there is a case wherein recording is performed by 6× speed on the inner circumference, by CAV mode till zone 10, and by ZCLV (Zoned Constant Linear Velocity) mode after zone 10. In this case, as the following equation, the parameters are given as a function of the linear velocity v[n] for each zone and interpolation may be performed for the linear velocity.

$$P[v[n]] = P[v[0]] + (P[v[34]] - P[v[0]]) \times \frac{(v[n] - v[0])}{(v[34] - v[0])} \quad \text{(Equation 2)}$$

wherein P[v[0]]: an inner circumference trial writing result and P[v[34]]: an outer circumference trial writing result.

In case of performing a recording operation by such recording parameter interpolation, if the cutoff phenomenon arises in the velocity between the innermost circumference (about 6× speed) and the outermost circumference (about 16× speed), because the emitting light waveform largely change before and after that, the normal recording operation can not be realized. Even in the same laser driving IC, due to various causes such as unevenness in manufacture, the operation environment such as power source voltage and environmental temperature, and the electrical capacity and operation voltage of the semiconductor laser chip as a load, the pulse width in which the cutoff phenomenon arises varies. Further, just at the recording speed at which the cutoff phenomenon arises, the cutoff phenomenon arises in probability, and in case that the cutoff phenomenon arises or does not arise in accordance with the location, even if a device is made in which trial writing is carried out a plurality of times with changing the velocity on the outer circumference portion and calibration of recording conditions is carried out under conditions that the cutoff phenomenon arises, normal data recording can not be performed.

For solving such problems, in order that the cutoff phenomenon may not arise in the drive device and the evaluator, a recording pulse in which all the pulse width are restricted to 1T or more may be used. As described above, the cutoff phenomenon arises from the middle pulse of 4T. Therefore, when the 4T mark is recorded, not the recording pulse made up of the first pulse, middle pulse, and last pulse as in the conventional case is used, but it may be recorded by a mono pulse (a single pulse) like a case of recording a 3T mark.

FIGS. 1A and 1B show a recording method according to the present invention. Here, the power level of the middle pulse of the 4T mark is defined as Bias Power 3 (4T), and this is forced to be equal to Peak Power. In the pulse waveform of FIG. 1A, (1) the 3T mark is recorded by a mono pulse that is raised from a first power level as Bias power 1 (erase level) to a second power level as Peak level (recording level), held in this state, and then dropped to the above first power level or less; (2) the 4T mark is recorded by a mono pulse that is raised from the above first power level to the above second power level, held in this state, and then dropped to the above first power level or less (cooling pulse, although it is dropped to Bias power 2 in FIG. 1, it may be dropped to Bias Power 1); and (3) marks having the lengths of 5T and more are recorded by a pulse that is raised from the above first power level to the above second power level, held in this state, then raised to a third power level between the first and second power levels, held in this state, then raised to the second power level, held in this state, and then dropped to the first power level or less, and recording is performed in the period of the above third power level of 1T or more. Further, in consideration of the variable range of the setting parameters, because also the last pulse width and the 5T mark middle pulse width are less than 1T in the definition of FIG. 2B, in the definition of FIG. 1B, the setting range of the last pulse width is elongated by 0.5T to 1.0-2.0T, the width of the middle pulse is newly defined as $T_{FL}$, and restriction is added so that it is 1T or more.

Next, means for solving (Problem 2) will be described. As described above, if a high-power semiconductor laser is used for realizing high-speed recording and signals are read out in a wide band for realizing high-speed reproduction, influence by amplifier noise and laser noise increases and S/N ration in the reproduction signal is lowered. Here, it is thought to increase the reproduction power. In this case, because the amplitude of the reproduction signal becomes relatively large in comparison with the amplifier noise, the influence by the amplifier noise decreases and the S/N ratio is improved. Further, because the noise generated from the semiconductor laser is influenced by natural radiation light as a light quantity component that is not laser-oscillated in the laser cavity, if the reproduction power is increased, the laser noise is reduced and the S/N ratio in the reproduction signal is improved because the above influence decreases. On the other hand, if the reproduction power is too increased, the temperature of the recording film excessively rises in reproduction and the amorphous mark is crystallized to deteriorate the data quality. Conventionally, in the standards of DVD-RAM 2× speed, 3× speed, and 5× speed, the reproduction power Pr is fixed to 1 mW. In case of recording/reproducing within the range from 6× speed to 16× speed, the value of the reproduction power Pr2 for improving the S/N ratio in the reproduction signal within a range in which the data quality is not deteriorated is determined by the medium maker. If the Pr2 value is recorded in the control data, by the drive device reading out that value and using it upon reproduction at 6× speed or more, the S/N ratio in the reproduction signal can be improved without deteriorating the data quality.

By the above, (Problem 1) and (Problem 2) for realizing a DVD-RAM 16× speed technique can be solved and a recording method suitable for CAV recording and an optical disk device using it can be provided.

More specifically, first, experimental results of means for solving (problem 1) will be described. Using the LM330A evaluator and DVD-RAM disks using a bismuth-base phase change type recording film (see the above http://www.maxell.co.jp/company/news/2004/040422.html), an effect of improving the cutoff phenomenon was verified.

FIG. 5 shows experimental results showing jitters of first-time record data from 6× speed to 16× speed. Adjustment of recording conditions was performed at 6× speed and 16× speed, and as recording conditions of the speeds between them, those interpolated by (Equation 2) were used. Measurement of jitter values is carried out at 6× speed. When a conventional non-multi pulse is used, the cutoff phenomenon arises near 10× speed and the jitter value increases. On the other hand, when a mono pulse is used for recording the 4T mark, the jitter value becomes constant as about 5% irrespective of speed, and good recording performance was obtained.

FIG. 6 shows reproduction waveforms of signals recorded at 6× speed, 10× speed, and 16× speed. As described above, in the used evaluator, when the cutoff phenomenon arises, the level of the middle pulse of the 4T mark becomes Peak Power and energy is excessively applied. As shown in the drawing, when the conventional non-multi pulse is used, it is known that the 4T mark is the longest in the signal recorded at 10× speed and fluctuation is large. On the other hand, when the mono pulse is used for recording the 4T mark, a good eye pattern is obtained even at 10× speed. Although this is superfluous, reasons for well performing recording at 6× speed and 16× speed even when the conventional non-multi pulse is used will be described. In case of 6× speed, because no cutoff phenomenon has arisen, trial writing normally functions and the recording conditions are optimized. In case of 16× speed, although the level of the middle pulse of the 4T mark becomes Peak Power due to the cutoff phenomenon and the emitting waveform becomes a mono pulse, because it is apart from the cutoff conditions, the light pulse itself is stable and therefore the conditions are optimized by trial writing and a good jitter value is obtained. However, because interpolation of recording conditions by (Equation 2) is carried out to an instruction value, because of an influence in which the instruction value and the light pulse de not coincide with each other at 16× speed, the jitter value becomes bad other than 6× speed and 16× speed. Further, because 10× speed corresponds to threshold conditions under which the cutoff phenomenon arises, the light pulse itself is instable and further the jitter value becomes bad.

FIGS. 7 to 9 show recording conditions at 6× speed, 10× speed, and 16× speed, respectively, and show parameters when a mono pulse is used for recording the 4T mark. As for power value, recording can be performed with Peak Power of 19.5 mW at 16× speed. For example, considering that power of about 50 mW is required in case of 16× speed recording on a DVD-R medium, it is found that the recording sensitivity is remarkably high. Here, the value of pulse parameter is shown in a unit of $T_w/16$ where the detection window width is represented by $T_w$. This is because a MUX type pulse generator (see the above http://www.hitachi.co.jp/New/cnews/month/2004/0422a.html) is used.

FIGS. 10 to 12 show recording conditions at 6× speed, 10× speed, and 16× speed, respectively, and show parameters when the conventional non-multi pulse is used. When those parameters were determined, for easiness of comparison, only pulse conditions of the 4T mark were adjusted to the parameter of the mono pulse for recording 4T, and for the other powers and pulse parameters, the same ones were used.

Next, results of means for solving (Problem 2) will be described.

FIG. 13 shows experimental results when relation between reproduction power and jitter was measured at 6× speed and 16× speed. As shown in the drawing, the jitter value is improved by increasing the reproduction power from 1 mW as the conventional standard value. At 16× speed, in comparison with a case wherein the reproduction power is 1 mW, for improving the jitter value by 0.5% or more, it is found to require a reproduction power of 1.5 mW or more. On the other hand, as for deterioration of data quality, the jitter value starts to deteriorate when the reproduction power becomes about 2.4 mW at 6× speed and about 3.0 mw or more at 16× speed. This indicates that crystallization of an amorphous mark progresses. Only from this data, even if reproduction is repeated, for example, ten millions times, the value of the reproduction power at which the data quality does not deteriorate can not be estimated. Thus, using a thermal simulation, the change in peak temperature of the recording film to the change in reproduction speed was calculated.

FIG. 14A shows calculation results of dependency of peak temperature of the recording film upon reproduction speed when the reproduction power is 1 mW. Here, the room temperature was assumed to be 25° C. As shown in the drawing, while the peak temperature is about 100° C. in case of 2× speed reproduction, it is found that the temperature lowers to about 70° C. at 16× speed. This reflects a fact that the passing time of the light beam shortens attendant upon an increase in linear velocity. In 2× speed, the peak temperature of the recording film is about 100° C., and in disks on the market, deterioration of data by reproduction does not occur under those conditions. Therefore, if conditions under which the peak temperature of the recording film becomes about 100° C. likewise even upon reproduction at 6× speed or more are obtained, it can be one standard for determining a suitable reproduction power.

FIG. 14B shows calculation results of dependency of reproduction power upon reproduction speed when the peak temperature of the recording film becomes about 100° C. It was found that the value of the reproduction power at which the peak temperature of the recording film becomes about 100° C. was about 1.3 mW at 6× speed and about 1.8 mW at 16× speed. Because it has been found from the above experimental results that the reproduction power is desirably 1.5 mW or more, in consideration of error between calculation and experiment, it can be the that a reproduction power of 1.5 mW to about 2.0 mW is suitable for 6× speed or more. As described above, a DVD-RAM medium is two or more times higher in recording sensitivity than a DVD–R medium, and a recent recording type DVD drive copes with all media, such as a super multi drive. Therefore, in a DVD-RAM medium coping with 6-16× speed, if the recording sensitivity is deteriorated more than the sample disk shown here and thereby the temperature increase upon reproduction is suppressed, the drive device does not become short in recording power and the S/N ratio in the reproduction signal can be improved.

In DVD-RAM till 5× speed, the reproduction power was 1 mw. It was also shown that the reproduction power was desirably, for example, 1.5 mW in DVD-RAM of 6× speed or more. However, even in case of a DVD-RAM medium of 6× speed or more, it must be considered that only reproduction is possible in a conventional 2× speed drive device. Therefore, even in DVD-RAM of 6× speed or more, the basic format must be as conventional. At this time, for judgment whether a medium loaded in the drive device is according to the 2× speed standard or the standard of 6× speed or more, it can not be judged until control data is reproduced. Further, even in a medium of 6× speed or more, in order that it can be reproduced in a conventional drive device, deterioration of data by reproduction must not occur under conditions of a reproduction power of 1 mW at 2× speed. For solving such problems, a processing sequence upon loading in the drive device may be made proper. This will be described later in embodiments.

By the above, it was shown that two problems for realizing DVD-RAM 16× speed could be solved by using a recording method and an optical disk device provided by the present invention. Effects of the present invention will be collected as follows.

Occurrence of the cutoff phenomenon of a laser driving circuit could be prevented and guarantee of compatibility of recording parameters and CAV recording could be realized. Further, S/N ratio on reproduction at a high speed could be improved and deterioration of data could be prevented.

Other objects, features and advantages of the invention will become apparent from the following description of the embodiments of the invention taken in conjunction with the accompanying drawings.

BRIEF DESCRIPTION OF THE DRAWINGS

FIGS. 1A and 1B show a recording pulse of the present invention;

FIGS. 2A and 2B show a non-multi type recording pulse adopted by 5× speed DVD-RAM;

FIG. 16 shows reproduction signals, jitter values, and bit error rates;

FIG. 17 shows measurement results of jitter value and bit error rate when the recording speed and reproduction speed are changed;

DESCRIPTION OF THE EMBODIMENTS

Hereinafter, details of the present invention will be described with embodiments.

Embodiment 1

Recording Method

Details of a recording method of the present invention is as described above. Here, experimental results using the recording method and details of a setup sequence will be described.

Figure 3:
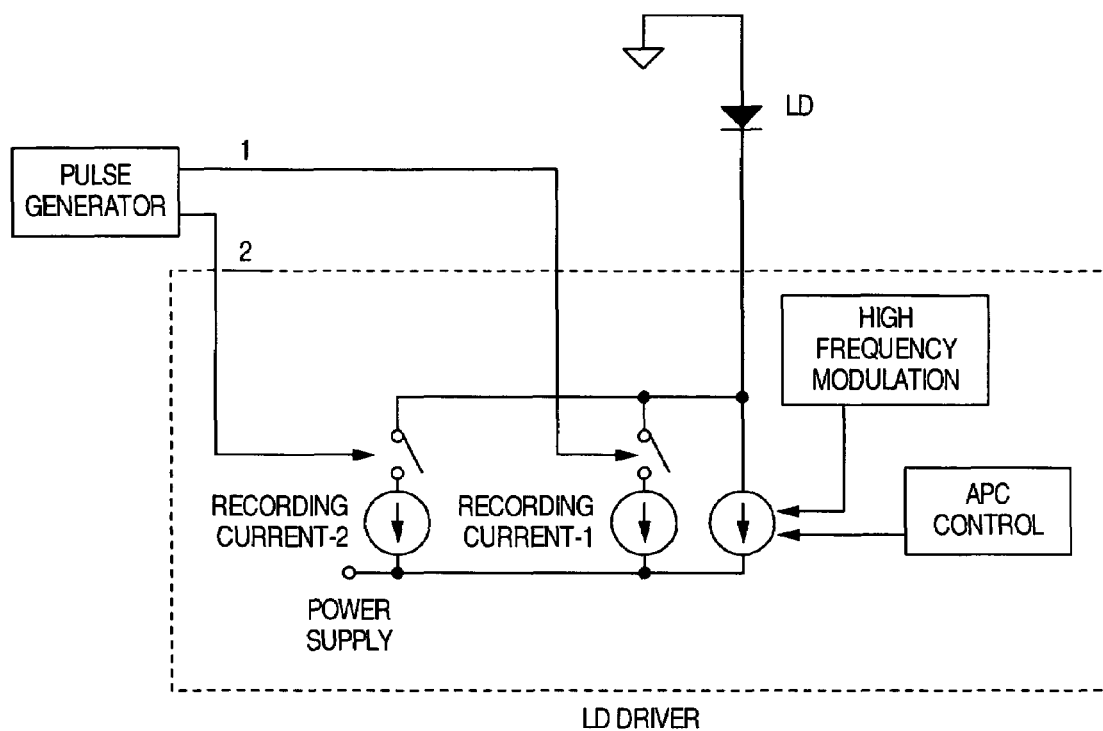
FIG. 3 typically shows a laser driving circuit in a general DVD-RAM evaluation system.
Figure 4:
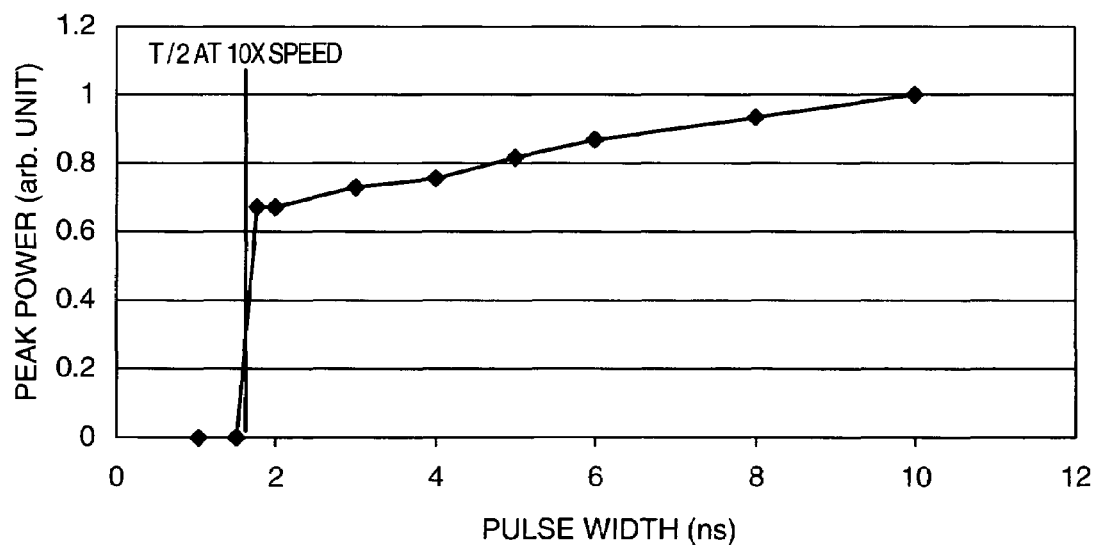
FIG. 4 shows characteristics of a laser driving circuit of a DVD-RAM evaluator (LM330A) made by ShibaSoku used in an experiment.
Figure 5:
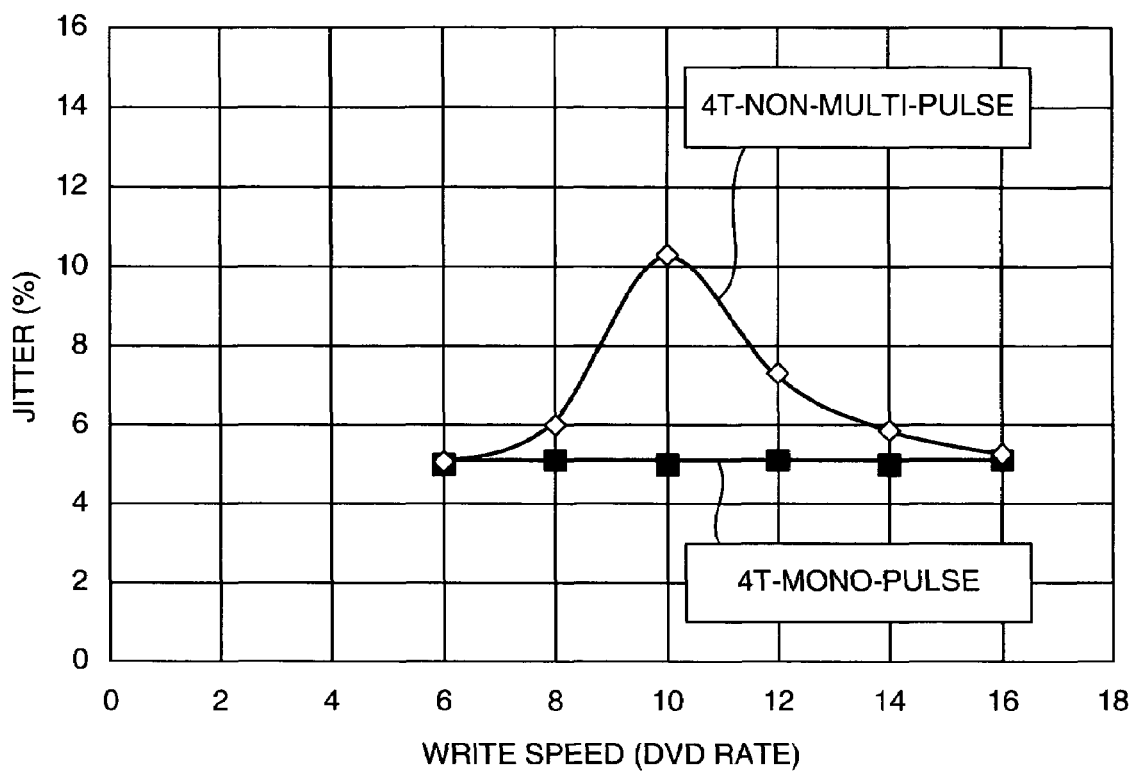
FIG. 5 shows experimental results showing jitters of first-time record data from 6× speed to 16× speed.
Figure 6:
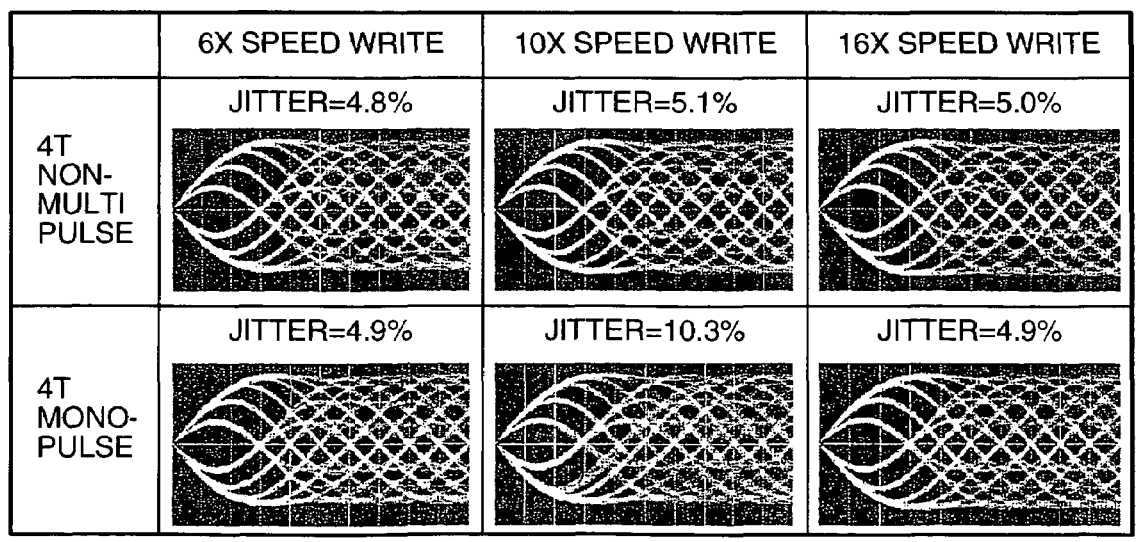
FIG. 6 shows reproduction waveforms of signals recorded at 6× speed, 10× speed, and 16× speed.
Figure 7:
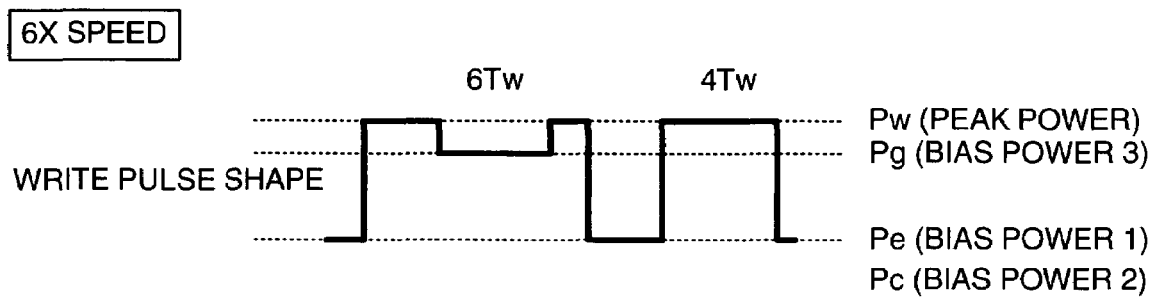
FIG. 7 shows recording conditions at 6× speed, which shows results when a mono pulse is used for recording a 4T mark.
Figure 8:
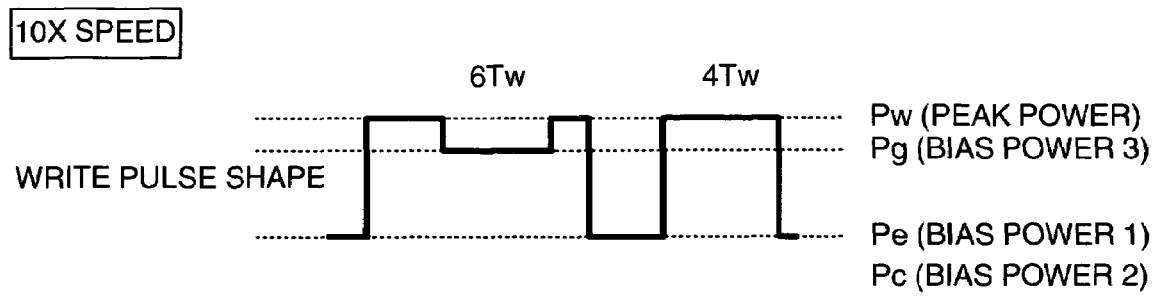
FIG. 8 shows recording conditions at 10× speed, which shows results when the mono pulse is used for recording the 4T mark.
Figure 9:
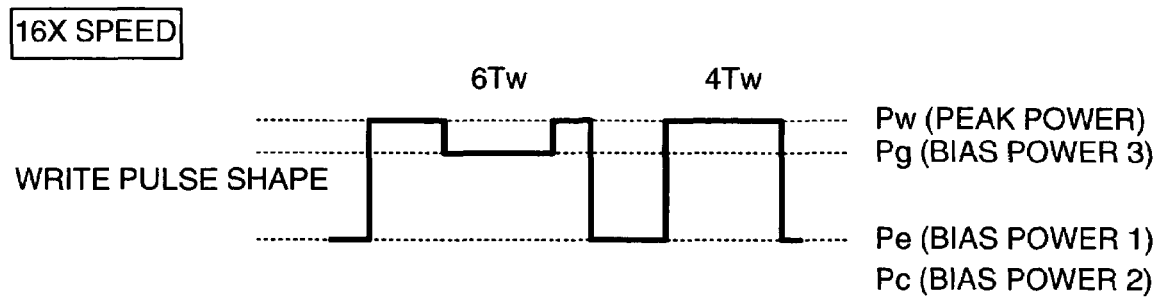
FIG. 9 shows recording conditions at 16× speed, which shows results when the mono pulse is used for recording the 4T mark.
Figure 10:
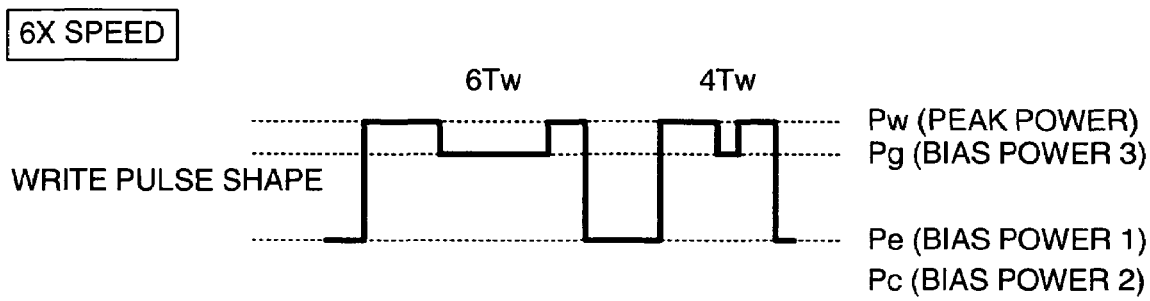
FIG. 10 shows recording conditions at 6× speed, which shows results when a non-multi pulse is used.
Figure 11:
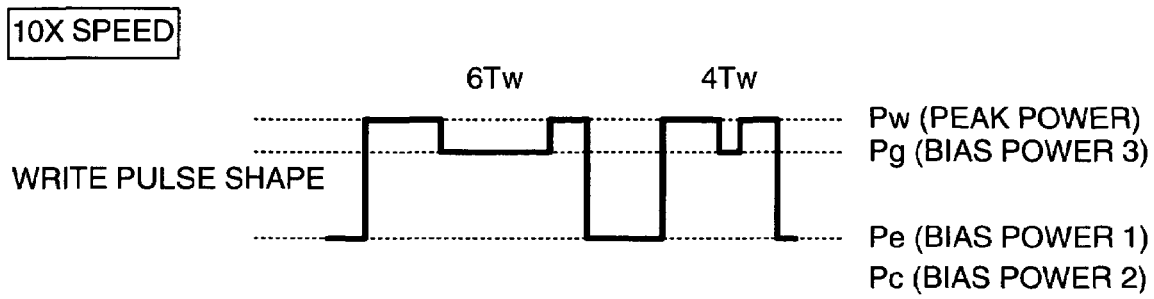
FIG. 11 shows recording conditions at 10× speed, which shows results when the non-multi pulse is used.
Figure 12:
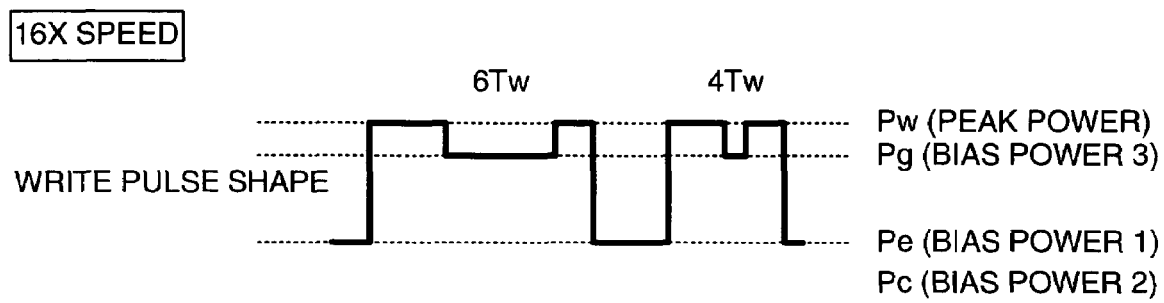
FIG. 12 shows recording conditions at 16× speed, which shows results when the non-multi pulse is used.
Figure 13:
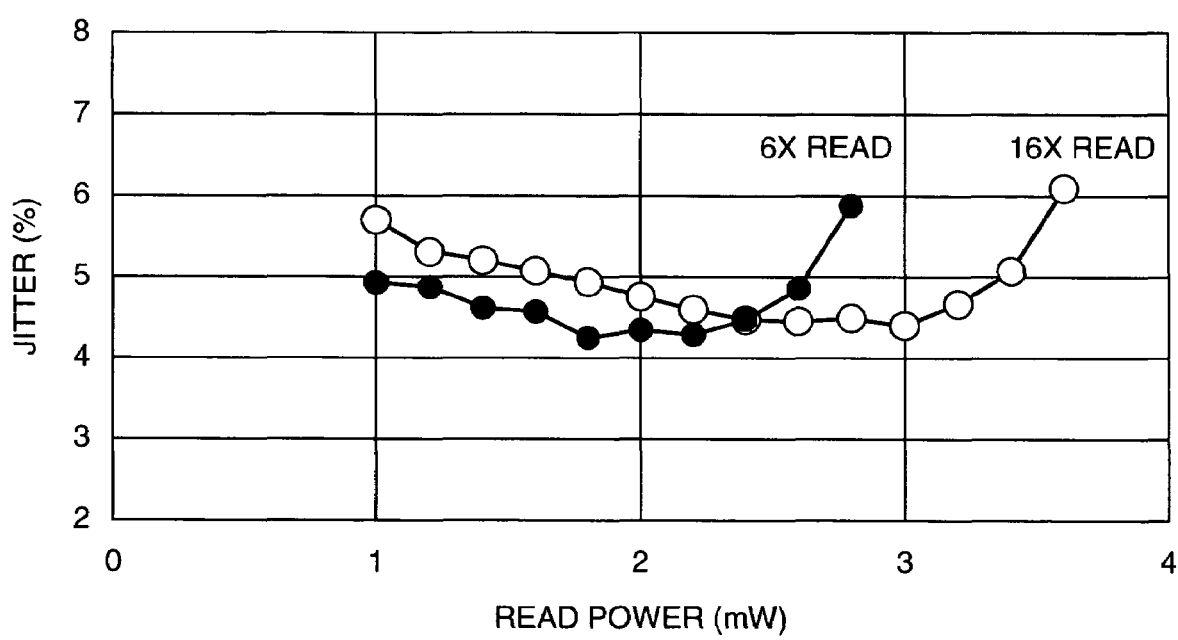
FIG. 13 shows experimental results when relation between reproduction power and jitter is measured at 6× speed and 16× speed.
Figure 14A:
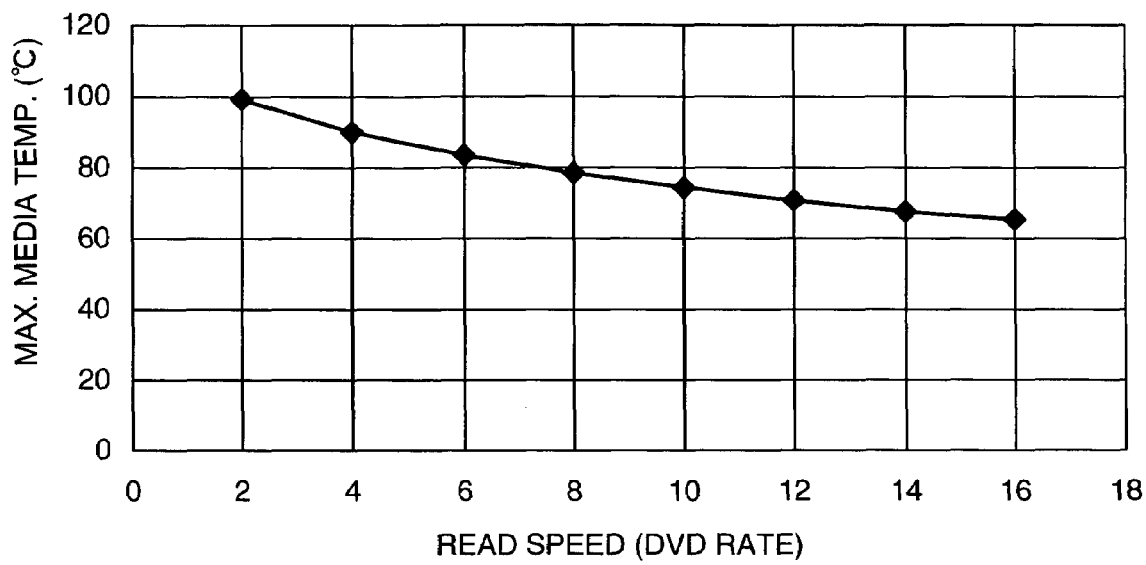
FIGS. 14A and 14B show dependency of peak temperature of a recording film upon reproduction speed.
Figure 14B:
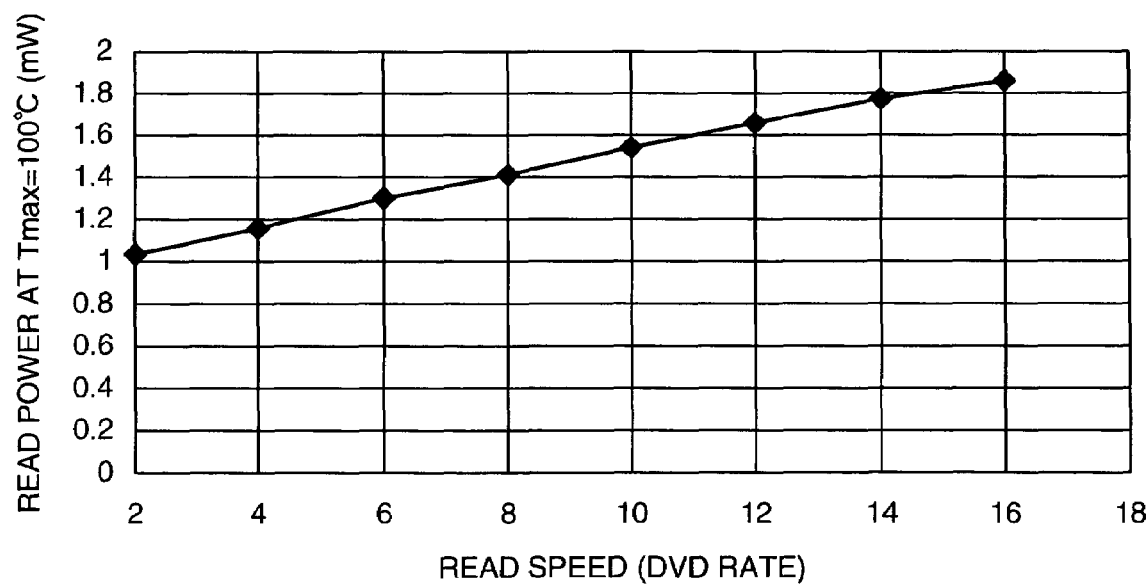
Figure 15:
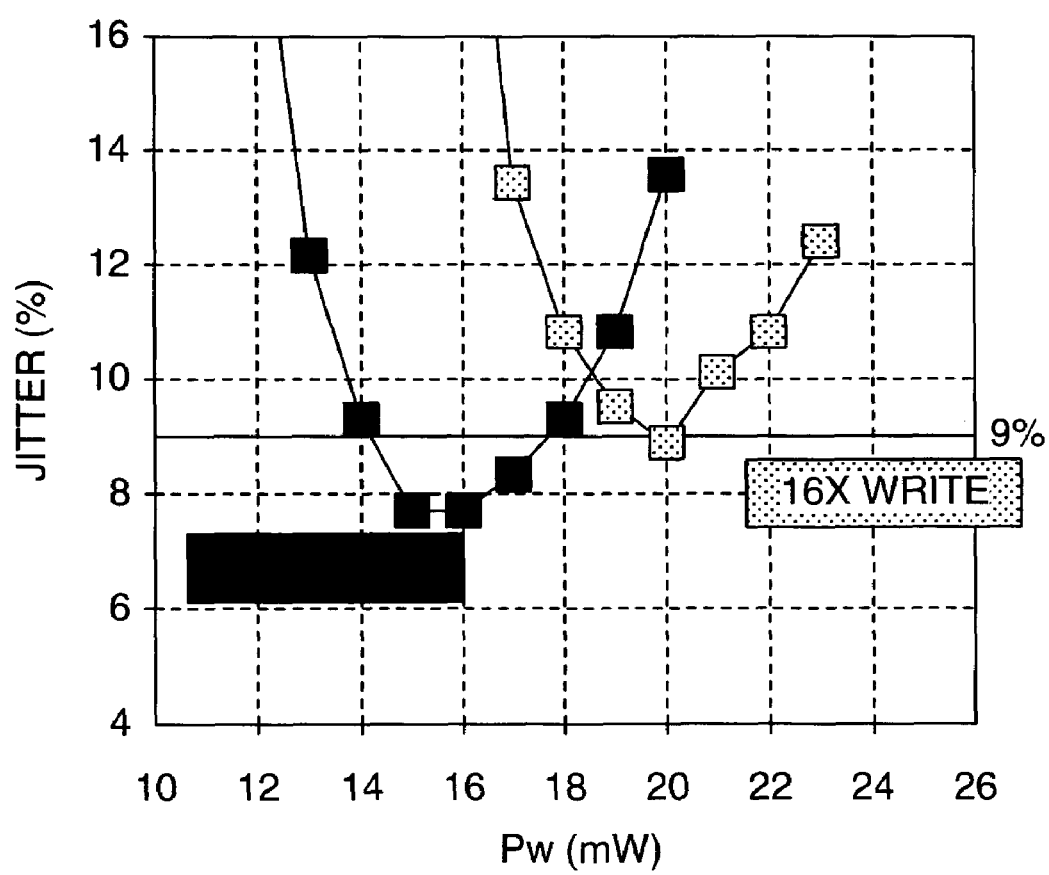
FIG. 15 shows dependency of overwrite jitter upon recording power when recording/reproducing are performed at 6× speed and 16× speed using a recording pulse of the present invention, respectively.

FIG. 15 shows experimental results showing dependency of overwrite jitter upon recording power when recording/reproducing are performed at 6× speed and 16× speed using a recording pulse of the present invention, respectively. As shown in the drawing, good jitter values of 9% or less could be obtained. The reproduction power was 1.5 mW.

FIG. 16 shows reproduction signals, jitter values, and bit error rates on the above experiment. The bit error rate was measured using a PRML (Partial Response Maximum Likelihood) method with the class being set at PR(3,4,4,3). Good bit error rates of $10^{-6}$ or less could be obtained.

FIG. 17 shows measurement results of jitter value and bit error rate when the recording speed and reproduction speed are changed. In case of 2× speed, the reproduction power was set at 1 mW. Under any condition, good bit error rates of $10^{-6}$ or less could be obtained.

Figure 18:
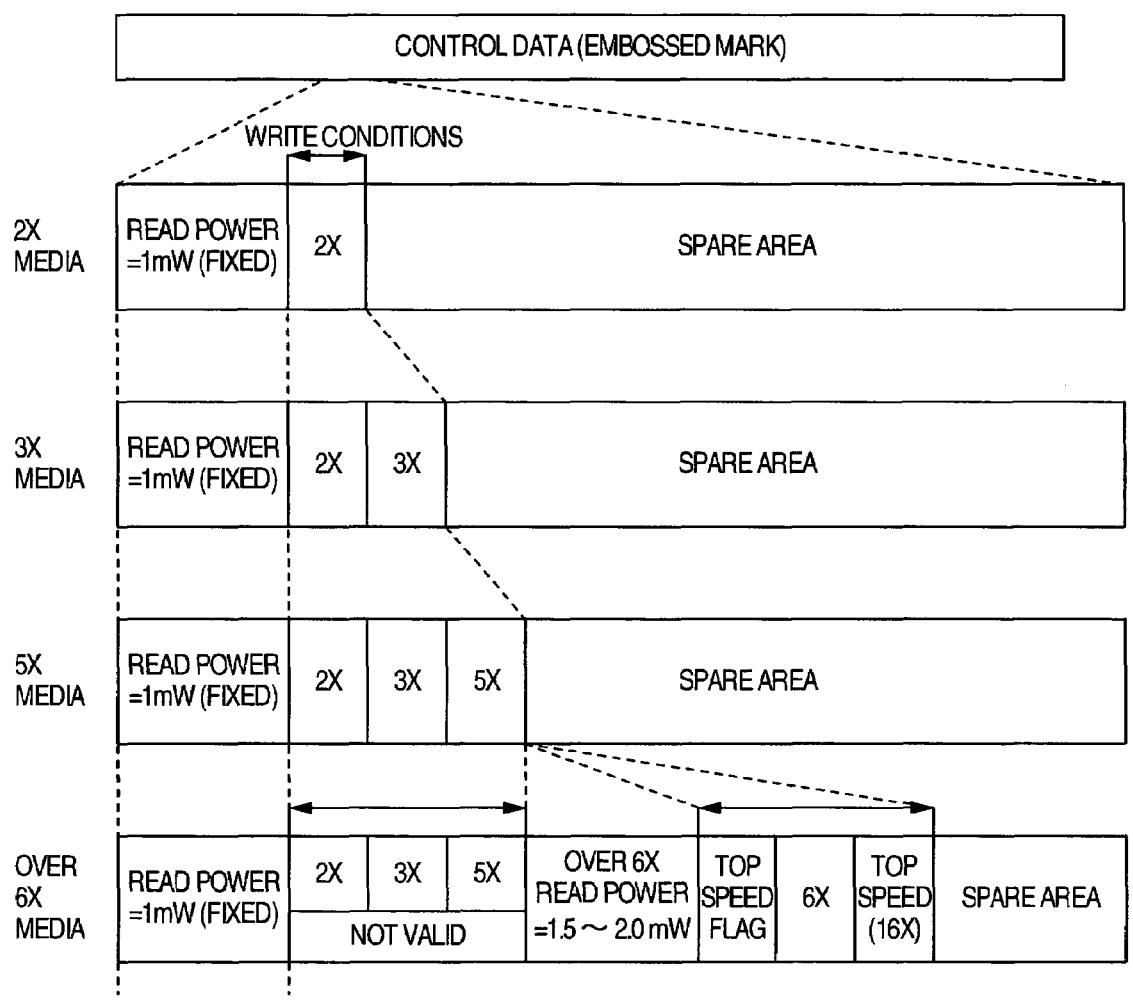
FIG. 18 shows contents of data recorded in control data.

FIG. 18 shows contents of data recorded in control data. In conventional 2× speed, 3× speed, and 5× speed DVD-RAM media, downward compatibility has been kept in recording. Therefore, in the control data on a 5× speed DVD-RAM medium, in addition to 2× speed recording conditions, areas for storing recording conditions of 3× speed and 5× speed have been added. The reproduction power is 1 mW in common.

On the other hand, on a DVD-RAM medium of 6× speed or more, recording at 5× speed or less is impossible. This is determined from a physical demand that the phase change recording film forms or erases a recording mark in accordance with a temperature history upon recording. However, in order that at least reproduction can be performed even in a conventional drive device, on the format, it is required to store data in the areas for 2× speed, 3× speed, and 5× speed recording conditions. Because these values are necessary values for convenience' sake, for example, it is desirable to record fixed data standardized by a standard book. As recording/reproducing conditions of 6× speed or more, as described above, values of the reproduction power, recording conditions at 6× speed, and recording conditions at the maximum speed are stored. Here, the maximum speed corresponds to 16× speed in the above description. If the conditions are relaxed as the maximum speed, even in case that there is a media that can cope with only 12× speed or less as a result of simplification of the film construction of the media, for example, for cost reduction, it can be accepted. If the maximum speed is stored in the form of, for example, a flag, it is preferable because the control data area can be saved.

For reading out the reproduction power and recording conditions from a disk storing thereon such control data, and making a drive device to be able to perform recording/reproducing without deteriorating record data, a setup sequence is important.

Figure 19:
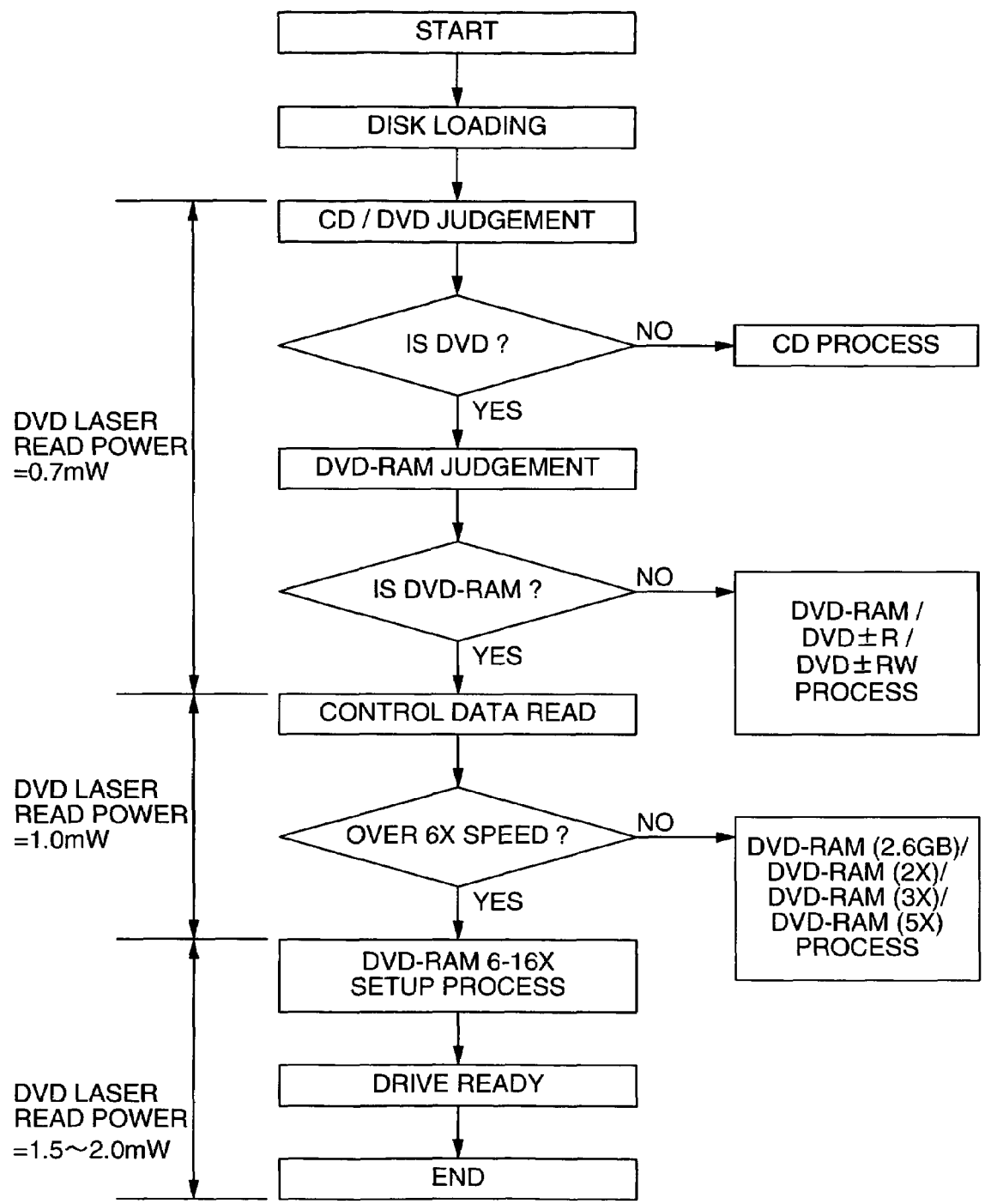
FIG. 19 shows an embodiment of a setup sequence of a DVD super multi drive device.

FIG. 19 shows an embodiment of a setup sequence of a DVD super multi drive device. In the super multi drive device, for coping with both of CD and DVD, judgment of a CD/DVD medium is executed after loading. For this, differences in wavelength and in base thickness are utilized. For easily judging, there is a method in which each of lasers for CD/DVD is driven, an objective lens is moved in a focus direction, the quantity of reflected signal from the information recording face is measured, and the side from which a larger reflected signal is obtained is judged; or the like. In case that the medium is DVD, it is subsequently judged whether it is DVD-RAM or others. For this, the degree of modulation of a push-pull signal may be used. Because the track structure is land groove only in DVD-RAM, the degree of modulation of the push-pull signal is three or more times larger than that of the others. Till here, for preventing deterioration of reproduction data of a DVD±R/RW medium, the reproduction power of DVD is set at 0.7 mW. Here, in case that the judgment result indicates a DVD-RAM medium, the reproduction power is set at 1 mW, the control data is reproduced to read out format information, and it is judged which medium of 2× speed, 3× speed, 5× speed, and 6× speed or more it is. Here, in case of a medium of 6× speed or more, the linear velocity is set at 6× speed or more, the reproduction power is set at a value indicated by the control data (1.5-2.0 mW in the above-described example), an exclusive setup process is executed, and then a ready state capable of receiving recording/reproducing instructions from a host computer is established. The setup sequence includes therein trial writing processing.

Figure 20:
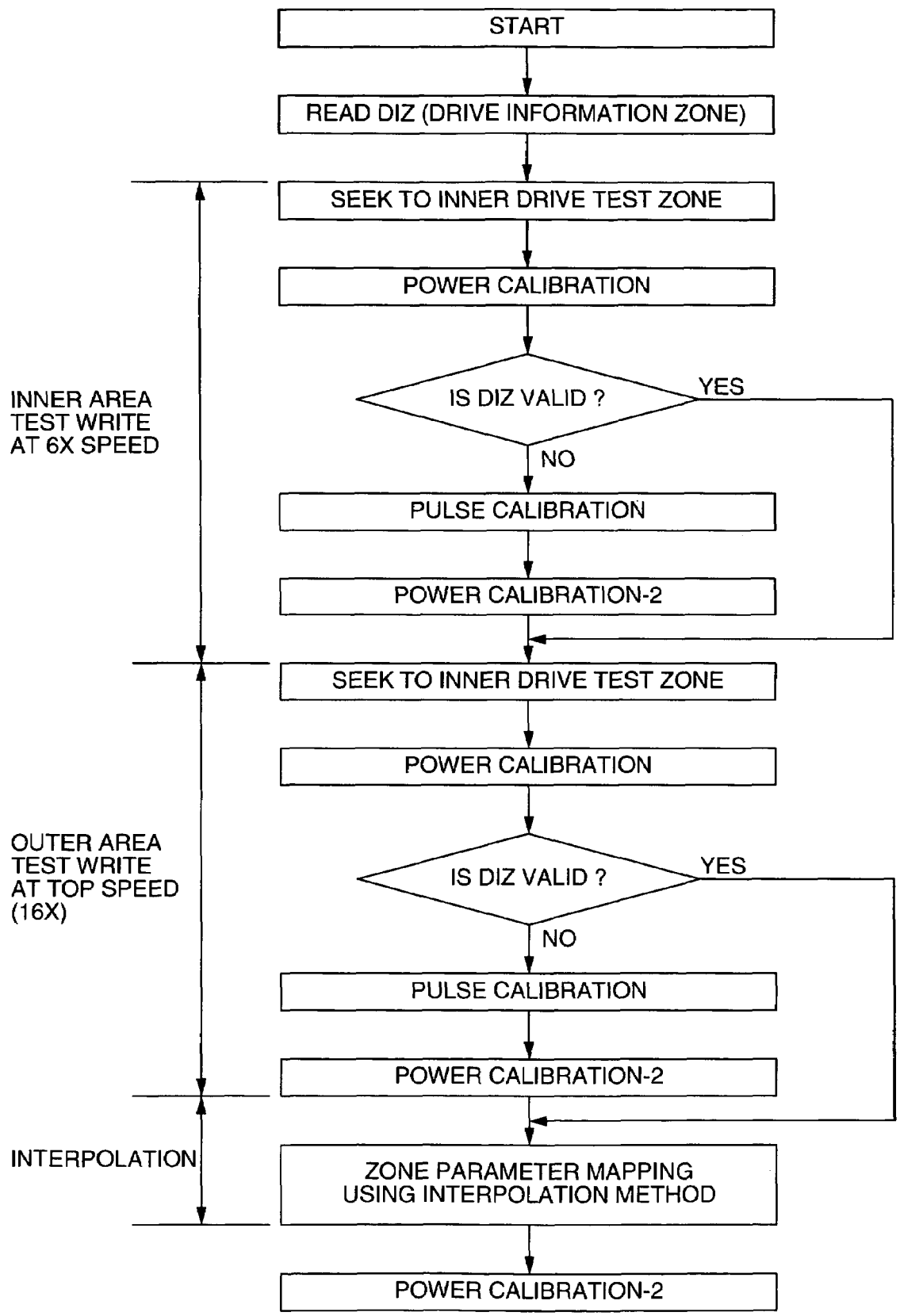
FIG. 20 shows an embodiment of trial writing.

FIG. 20 shows an embodiment of trial writing. First, moving to a rewrite area, DIZ (Drive Information Zone) is reproduced. Recording conditions peculiar to the drive and so on are recorded in DIZ. Trial writing is carried out on the basis of the control data and DIZ. First, trial writing at 6× speed is carried out on an inner circumferential trial writing area to calibrate recording conditions. Next, moving to an outer circumferential trial writing area, trial writing under conditions of the maximum speed is carried out. Next, recording conditions for each zone are determined on the basis or (Equation 1) or (Equation 2), and then processing ends. As a specific method for determining power and pulse conditions, a method described in WO01/011614 or the like may be used.

Embodiment 2

Optical Disk Device

Figure 21:
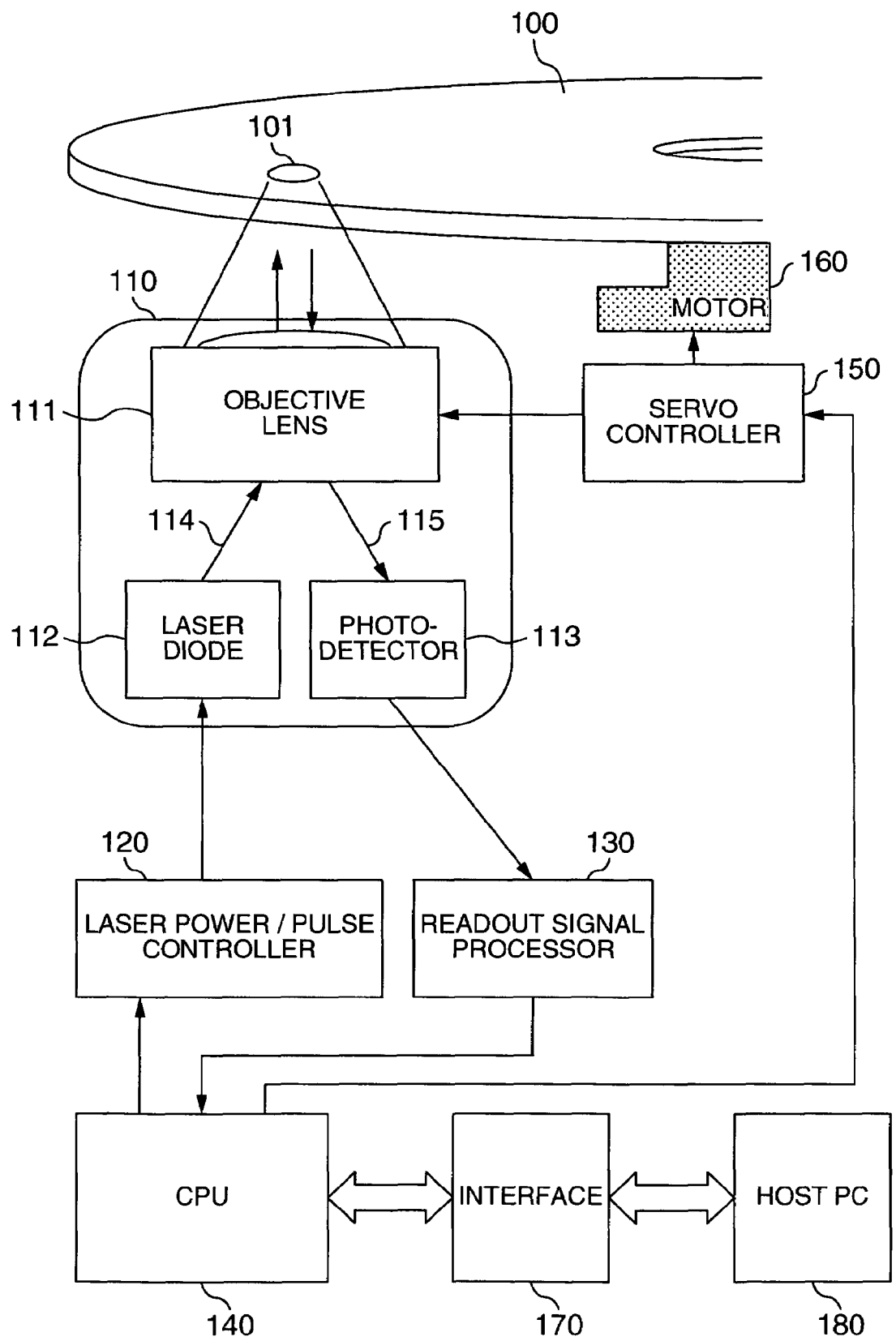
FIG. 21 shows an embodiment showing a construction of an optical disk device of the present invention.

FIG. 21 shows an embodiment showing a construction of an optical disk device of the present invention. An optical disk medium 100 is rotated by a motor 160. Upon reproduction, a laser power/pulse controller 120 controls current flowing in a semiconductor laser 112 within an optical head 110 so that optical intensity instructed by CPU 140 is obtained, to generate a laser light 114, and the laser light 114 is converged by an objective lens 111 to form an optical spot 101 on the optical disk medium 100. A reflected light 115 from the optical spot 101 is detected by a photo-detector 113 via the objective lens 111. The photo-detector 113 comprises a plurality of divided photo detective elements. A readout signal processor 130 used a signal detected by the optical head 110 to reproduce information recorded on the optical disk medium 100. Upon recording, the laser power/pulse controller 120 converts predetermined record data into predetermined recording pulse current, and makes control so that a pulse light emits from the semiconductor laser 112. A function of generating a recording pulse shown in FIG. 1 is installed in the laser power/pulse controller 120. Further, the above-described setup sequence and trial writing processing are executed by instructions of CPU 140. The above-described signal processing circuits 40 and 50 for trial writing are installed in the readout signal processor 130.

The present invention is used in an optical disk device coping with DVD-RAM using a phase change material.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. An information recording method for recording information on an optical disk medium using a first power level and a second power level higher than the first power level, recording being performed at 6× speed or more, the method comprising:

when a detection window width is T, recording a 3T mark with a mono pulse that is raised from the first power level to the second power level, held in its raised state, and then dropped to the first power level or less;

recording a 4T mark with a mono pulse that is raised from the first power level to the second power level, held in its raised state, and then dropped to the first power level or less; and recording a mark having a length of 5T or more with a pulse that is raised from the first power level to the second power level, held in its raised state, then dropped to a third power level between the first and second power levels, held in its dropped state, then raised to the second power level, held in its raised state, and then dropped to the first power level or less, the recording with the third power level being performed for a period of 1T or more.

2. The information recording method according to claim 1, wherein the first power level is an erasing level, the second power level is a recording level, and the third power level is between the erasing level and the recording level.

3. The information recording method according to claim 1, wherein the recording is performed at 16× speed.

4. A recording method for recording information on an optical disk medium using a first power level and a second power level higher than the first power level, the method comprising:

reproducing a control data when contents of the control data is for 6× speed or more, reading out a stored reproduction power for 6× speed or more, setting a linear velocity at 6× speed or more, and then converting a reproduction power into the reproduction power for 6× speed or more;

afterward, when a detection window width is T, recording a 3T mark with a mono pulse that is raised from the first power level to the second power level, held in its raised state, and then dropped to the first power level or less;

recording a 4T mark with a mono pulse that is raised from the first power level to the second power level, held in its raised state, and then dropped to the first power level or less; and recording a mark having a length of 5T or more with a pulse that is raised from the first power level to the second power level, held in its raised state, then dropped to a third power level between the first and second power levels, held in its dropped state, then raised to the second power level, held in its raised state, and then dropped to the first power level or less, the recording with the third power level being performed for a period of 1T or more, using those recording pulses, performing trial writing on inner and outer circumferences the optical disk medium, and based on results of the trial writing, determining a recording parameter P[v[n]] of a zone number n as a function of a linear velocity v[n] by an interpolation processing using the following equation:

$$P[v[n]] = P[v[0]] + (P[v[34]] - P[v[0]]) \times \frac{(v[n] - v[0])}{(v[34] - v[0])}$$

where P[v[0]] indicates an inner circumference trial writing result and P[v[34]] indicates an outer circumference trial writing result.

5. The recording method according to claim 4, wherein the reproduction power for 6× speed or more is not less than 1.5 mW and not more than 2 mW.

6. An optical disk device for recording information on an optical disk medium using a first power level and a second power level higher than the first power level, the device comprising:

a circuit for setting a linear velocity at 6× speed or more;

a pulse generating circuit for setting a 3T mark at a mono pulse that is raised from the first power level to the second power level, held in its raised state, and then dropped to the first power level or less;

a 4T mark at a mono pulse that is raised from the first power level to the second power level, held in its raised state, and then dropped to the first power level or less; and a mark having a length of 5T or more at a pulse that is raised from the first power level to the second power level, held in its raised state, then dropped to a third power level between the first and second power levels, held in its dropped state, then raised to the second power level, held in its raised state, and then dropped to the first power level or less;

a circuit for performing trial writing on inner and outer circumferences of the optical disk medium using those recording pulses; and a calculating circuit for determining, based on results of the trial writing, a recording parameter P[v[n]] of a zone number n as a function of a linear velocity v[n] by an interpolation processing using the following equation:

$$P[v[n]] = P[v[0]] + (P[v[34]] - P[v[0]]) \times \frac{(v[n] - v[0])}{(v[34] - v[0])}$$

where P[v[0]] indicates an inner circumference trial writing result and P[v[34]] indicates an outer circumference trial writing result.

* * * * *